(12) United States Patent
Yuza et al.

(10) Patent No.: US 11,808,924 B2
(45) Date of Patent: Nov. 7, 2023

(54) IMAGING LENS

(71) Applicant: TOKYO VISIONARY OPTICS CO., LTD., Tokyo (JP)

(72) Inventors: Shingo Yuza, Sukagawa (JP); Kenichi Kamada, Sukagawa (JP)

(73) Assignee: TOKYO VISIONARY OPTICS CO., LTD., Tokyo (JP)

( * ) Notice: Subject to any disclaimer, the term of this patent is extended or adjusted under 35 U.S.C. 154(b) by 20 days.

(21) Appl. No.: 17/391,734

(22) Filed: Aug. 2, 2021

(65) Prior Publication Data

US 2021/0356715 A1    Nov. 18, 2021

Related U.S. Application Data

(63) Continuation of application No. 16/831,154, filed on Mar. 26, 2020, now Pat. No. 11,609,407.

(30) Foreign Application Priority Data

Mar. 27, 2019    (JP) ................. 2019-059619

(51) Int. Cl.
*G02B 9/60*    (2006.01)
*G02B 13/00*    (2006.01)
*H04N 23/54*    (2023.01)

(52) U.S. Cl.
CPC .......... *G02B 13/0045* (2013.01); *G02B 9/60* (2013.01); *H04N 23/54* (2023.01)

(58) Field of Classification Search
None
See application file for complete search history.

(56) References Cited

U.S. PATENT DOCUMENTS

| | | |
|---|---|---|
| 871,559 A | 11/1907 | Beck et al. |
| 8,514,500 B2 | 8/2013 | Tsai et al. |
| 10,101,563 B1 | 10/2018 | Tsai et al. |
| 2018/0059370 A1* | 3/2018 | Chen ............... G02B 13/02 |
| 2020/0150406 A1 | 5/2020 | Chen et al. |

FOREIGN PATENT DOCUMENTS

CN    105607232 A    5/2016

* cited by examiner

*Primary Examiner* — Darryl J Collins
(74) *Attorney, Agent, or Firm* — Hamre, Schumann, Mueller & Larson, P.C.

(57) ABSTRACT

There is provided an imaging lens with excellent optical characteristics while satisfying demand of low-profileness and low F-number. An imaging lens comprises, in order from an object side to an image side, a first lens with positive refractive power formed in a biconvex shape having an object-side surface and an image-side surface being convex in a paraxial region, a second lens with negative refractive power in a paraxial region, a third lens with the negative refractive power in a paraxial region, a fourth lens with the negative refractive power in a paraxial region, and a fifth lens with the positive refractive power having an image-side surface being convex in a paraxial region, and predetermined conditional expressions are satisfied.

5 Claims, 5 Drawing Sheets

IMAGING LENS

The present application is based on and claims priority of a Japanese patent application No. 2019-059619 filed on Mar. 27, 2019, the entire contents of which are hereby incorporated by reference.

BACKGROUND OF THE INVENTION

Field of the Invention

The present invention relates to an imaging lens which forms an image of an object on a solid-state image sensor such as a CCD sensor or a C-MOS sensor used in an imaging device.

Description of the Related Art

In recent years, it becomes common that camera function is mounted in various products, such as home appliances, information terminal equipment, automobiles, and the like. Development of products with the camera function will be made accordingly.

The imaging lens mounted in such equipment is required to be compact and to have high-resolution performance.

As a conventional imaging lens aiming high performance, for example, the imaging lens disclosed in the following Patent Document 1 has been known.

Patent Document 1 (CN105607232A) discloses an imaging lens comprising, in order from an object side, a first lens having positive refractive power and a convex object-side surface, a second lens having refractive power and a convex image-side surface, a third lens having negative refractive power, a fourth lens having negative refractive power and an aspheric image-side surface, and a fifth lens having refractive power and a convex image-side surface, wherein a relationship between a total track length and a focal length of an overall optical system satisfies a certain condition.

SUMMARY OF THE INVENTION

However, in lens configurations disclosed in the Patent Document 1, when a low profile and a low F-number are to be realized, it is very difficult to correct aberrations at a peripheral area, and excellent optical performance can not be obtained.

The present invention has been made in view of the above-described problems, and an object of the present invention is to provide an imaging lens with high resolution which satisfies demand of the low profile and the low F-number in well balance and excellently corrects aberrations.

Regarding terms used in the present invention, "a convex surface" or "a concave surface" of lens surfaces implies that a shape of the lens surface in a paraxial region (near the optical axis). "Refractive power" implies the refractive power in the paraxial region. "A pole point" implies an off-axial point on an aspheric surface at which a tangential plane intersects the optical axis perpendicularly. "A total track length" is defined as a distance along the optical axis from an object-side surface of an optical element located closest to the object to an image plane. "The total track length" and "a back focus" is a distance obtained when thickness of an IR cut filter or a cover glass which may be arranged between the imaging lens and the image plane is converted into an air-converted distance.

An imaging lens according to the present invention comprises, in order from an object side to an image side, a first lens with positive refractive power formed in a biconvex shape having an object-side surface and an image-side surface being convex in a paraxial region, a second lens with negative refractive power in a paraxial region, a third lens with the negative refractive power in a paraxial region, a fourth lens with the negative refractive power in a paraxial region, and a fifth lens with the positive refractive power having an image-side surface being convex in a paraxial region.

According to the imaging lens having the above-described configuration, the first lens achieves reduction in a profile by strengthening the refractive power. Furthermore, the first lens is formed in the biconvex shape having the object-side surface and the image-side surface being convex in the paraxial region; therefore, a curvature is suppressed from being large, and sensitivity to a manufacturing error can be reduced.

The second lens properly corrects chromatic aberration, spherical aberration, coma aberration, astigmatism and distortion.

The third lens properly corrects the coma aberration, the astigmatism and the distortion.

The fourth lens properly corrects the chromatic aberration, the astigmatism, field curvature and the distortion.

The fifth lens maintains a low profile and properly corrects the spherical aberration, the astigmatism, the field curvature and the distortion. An image-side surface of the fifth lens is convex in the paraxial region and a light ray incident angle to an image sensor can be properly controlled. As a result, a lens diameter of the fifth lens can be reduced and reduction in the diameter of the imaging lens can be achieved.

According to the imaging lens having the above-described configuration, it is preferable that an object-side surface of the second lens is convex in the paraxial region.

When the object-side surface of the second lens is convex in the paraxial region, the spherical aberration, the coma aberration, the astigmatism and the distortion can be properly corrected.

According to the imaging lens having the above-described configuration, it is preferable that an image-side surface of the second lens is concave in the paraxial region.

When the image-side surface of the second lens is concave in the paraxial region, the coma aberration, the astigmatism and the distortion can be properly corrected.

According to the imaging lens having the above-described configuration, it is preferable that an image-side surface of the third lens is concave in the paraxial region.

When the image-side surface of the third lens is concave in the paraxial region, the coma aberration, the astigmatism and the distortion can be properly corrected.

According to the imaging lens having the above-described configuration, it is preferable that the following conditional expression (1) is satisfied:

$$10.00 < vd2 < 30.00 \quad (1)$$

where vd2: an abbe number at d-ray of the second lens.

The conditional expression (1) defines an appropriate range of the abbe number at d-ray of the second lens. By satisfying the conditional expression (1), the chromatic aberration can be properly corrected.

According to the imaging lens having the above-described configuration, it is preferable that the following conditional expression (2) is satisfied:

$$0.10 < |r5|/f < 0.90 \quad (2)$$

where r5: a paraxial curvature radius of an object-side surface of the third lens, and f: a focal length of the overall optical system of the imaging lens.

The conditional expression (2) defines an appropriate range of the paraxial curvature radius of the object-side surface of the third lens. By satisfying the conditional expression (2), the coma aberration and the distortion can be properly corrected.

According to the imaging lens having the above-described configuration, it is preferable that the following conditional expression (3) is satisfied:

$$20.50 < T3/T4 < 49.00 \quad (3)$$

where

T3: a distance along the optical axis from an image-side surface of the third lens to an object-side surface of the fourth lens, and T4: a distance along the optical axis from an image-side surface of the fourth lens to an object-side surface of the fifth lens.

The conditional expression (3) defines an appropriate range of a relationship between the distance along the optical axis from the image-side surface of the third lens to the object-side surface of the fourth lens and the distance along the optical axis from the image-side surface of the fourth lens to the object-side surface of the fifth lens. By satisfying the conditional expression (3), the fourth lens is arranged at an optimum position, and aberration correction function of the lens becomes more effective. As a result, reduction in the profile can be achieved and the astigmatism and the distortion can be properly corrected.

According to the imaging lens having the above-described configuration, it is preferable that the following conditional expression (4) is satisfied:

$$2.00 < r8/f < 35.00 \quad (4)$$

where r8: a paraxial curvature radius of an image-side surface of the fourth lens, and f: a focal length of the overall optical system of the imaging lens.

The conditional expression (4) defines an appropriate range of the paraxial curvature radius of the image-side surface of the fourth lens. When a value is below the upper limit of the conditional expression (4), the distortion can be properly corrected. On the other hand, when the value is above the lower limit of the conditional expression (4), the astigmatism and the field curvature can be properly corrected.

According to the imaging lens having the above-described configuration, it is preferable that the following conditional expression (5) is satisfied:

$$-1.40 < r10/f5 < -0.40 \quad (5)$$

where r10: a paraxial curvature radius of an image-side surface of the fifth lens, and f5: a focal length of the fifth lens.

The conditional expression (5) defines an appropriate range of a relationship between the paraxial curvature radius of the image-side surface of the fifth lens and the focal length of the fifth lens. By satisfying the conditional expression (5), refractive power of the image-side surface of the fifth lens is suppressed from being excessive, and positive refractive power of the fifth lens becomes appropriate. As a result, reduction in the profile can be achieved, and the astigmatism, the field curvature and the distortion can be properly corrected.

According to the imaging lens having the above-described configuration, it is preferable that the following conditional expression (6) is satisfied:

$$-20.00 < f2/T2 < -5.50 \quad (6)$$

where f2: a focal length of the second lens, and

T2: a distance along the optical axis from an image-side surface of the second lens to an object-side surface of the third lens.

The conditional expression (6) defines an appropriate range of a relationship between the focal length of the second lens and the distance along the optical axis from the image-side surface of the second lens to the object-side surface of the third lens. By satisfying the conditional expression (6), refractive power of the second lens can be maintained, and the distance along the optical axis from the image-side surface of the second lens to the object-side surface of the third lens becomes appropriate. As a result, reduction in the profile can be achieved, and the chromatic aberration, the coma aberration, the astigmatism and the distortion can be properly corrected.

According to the imaging lens having the above-described configuration, it is preferable that the following conditional expression (7) is satisfied:

$$36.00 < vd4 < 77.00 \quad (7)$$

where vd4: an abbe number at d-ray of the fourth lens.

The conditional expression (7) defines an appropriate range of the abbe number at d-ray of the fourth lens. By satisfying the conditional expression (7), the chromatic aberration can be properly corrected.

According to the imaging lens having the above-described configuration, it is preferable that the following conditional expression (8) is satisfied:

$$0.30 < (T4/f) \times 100 < 1.20 \quad (8)$$

where

T4: a distance along the optical axis from an image-side surface of the fourth lens to an object-side surface of the fifth lens, and f: a focal length of the overall optical system of the imaging lens.

The conditional expression (8) defines an appropriate range of the distance along the optical axis between the fourth lens and the fifth lens. By satisfying the conditional expression (8), reduction in the profile can be achieved, and the astigmatism and the distortion can be properly corrected.

According to the imaging lens having the above-described configuration, it is preferable that the following conditional expression (9) is satisfied:

$$-16.50 < r2/f < -2.00 \quad (9)$$

where r2: a paraxial curvature radius of an image-side surface of the first lens, and f: a focal length of the overall optical system of the imaging lens.

The conditional expression (9) defines an appropriate range of the paraxial curvature radius of the image-side surface of the first lens. By satisfying the conditional expression (9), the coma aberration, the astigmatism and the distortion can be properly corrected.

According to the imaging lens having the above-described configuration, it is preferable that the following conditional expression (10) is satisfied:

$$0.45 < r4/|r5| < 2.00 \quad (10)$$

where
r4: a paraxial curvature radius of an image-side surface of the second lens, and
r5: a paraxial curvature radius of an object-side surface of the third lens.

The conditional expression (10) defines an appropriate range of a relationship between the paraxial curvature radius of the image-side surface of the second lens and the paraxial curvature radius of the object-side surface of the third lens. By satisfying the conditional expression (10), refractive powers of the image-side surface of the second lens and the object-side surface of the third lens can be appropriately balanced. As a result, the chromatic aberration, the coma aberration, the astigmatism and the distortion can be properly corrected.

According to the imaging lens having the above-described configuration, it is preferable that the following conditional expression (11) is satisfied:

$$4.00 < |r5|/D3 < 30.00 \quad (11)$$

where
r5: a paraxial curvature radius of an object-side surface of the third lens, and
D3: a thickness along the optical axis of the third lens.

The conditional expression (11) defines an appropriate range of a relationship between the paraxial curvature radius of the object-side surface of the third lens and the thickness along the optical axis of the third lens. By satisfying the conditional expression (11), refractive power of the object-side surface of the third lens can be maintained, and the thickness along the optical axis of the third lens can be secured. As a result, the astigmatism and the distortion can be suppressed and formability of the third lens can be excellent.

According to the imaging lens having the above-described configuration, it is preferable that the following conditional expression (12) is satisfied:

$$-3.50 < r7/T3 < -0.50 \quad (12)$$

where
r7: a paraxial curvature radius of an object-side surface of the fourth lens, and
T3: a distance along the optical axis from an image-side surface of the third lens to an object-side surface of the fourth lens.

The conditional expression (12) defines an appropriate range of a relationship between the paraxial curvature radius of the object-side surface of the fourth lens and the distance along the optical axis from the image-side surface of the third lens to the object-side surface of the fourth lens. By satisfying the conditional expression (12), reduction in the profile can be achieved, a light ray incident angle to the object-side surface of the fourth lens can be properly controlled, and the astigmatism and the distortion can be properly corrected.

According to the imaging lens having the above-described configuration, it is preferable that the following conditional expression (13) is satisfied:

$$2.00 < |r9|/f \quad (13)$$

where
r9: a paraxial curvature radius of an object-side surface of the fifth lens, and
f: a focal length of the overall optical system of the imaging lens.

The conditional expression (13) defines an appropriate range of the paraxial curvature radius of the object-side surface of the fifth lens. By satisfying the conditional expression (13), the astigmatism, the field curvature and the distortion can be properly corrected.

According to the imaging lens having the above-described configuration, it is preferable that the following conditional expression (14) is satisfied:

$$0.10 < T2/T3 < 0.90 \quad (14)$$

where
T2: a distance along the optical axis from an image-side surface of the second lens to an object-side surface of the third lens, and
T3: a distance along the optical axis from an image-side surface of the third lens to an object-side surface of the fourth lens.

The conditional expression (14) defines an appropriate range of a relationship between the distance along the optical axis from the image-side surface of the second lens to the object-side surface of the third lens and the distance along the optical axis from the image-side surface of the third lens to the object-side surface of the fourth lens. By satisfying the conditional expression (14), the third lens is arranged at an optimum position, and the distortion can be properly corrected.

Effect of Invention

According to the present invention, there can be provided an imaging lens with high resolution which satisfies demand of the low profile and the low F-number in well balance, and properly corrects aberrations.

DETAILED DESCRIPTION OF THE PREFERRED EMBODIMENT

Hereinafter, the preferred embodiments of the present invention will be described in detail referring to the accompanying drawings.

FIGS. 1, 3, 5, 7 and 9 are schematic views of the imaging lenses in Examples 1 to 5 according to the embodiments of the present invention, respectively.

An imaging lens according to the present invention comprises, in order from an object side to an image side, a first lens L1 with positive refractive power formed in a biconvex shape having an object-side surface and an image-side surface being convex in a paraxial region, a second lens L2 with negative refractive power in a paraxial region, a third lens L3 with the negative refractive power in a paraxial region, a fourth lens L4 with the negative refractive power in a paraxial region, and a fifth lens L5 with the positive refractive power having an image-side surface being convex in a paraxial region.

A filter IR such as an IR cut filter or a cover glass is arranged between the fifth lens L5 and an image plane IMG (namely, the image plane of an image sensor). The filter IR is omissible.

Figure 5:
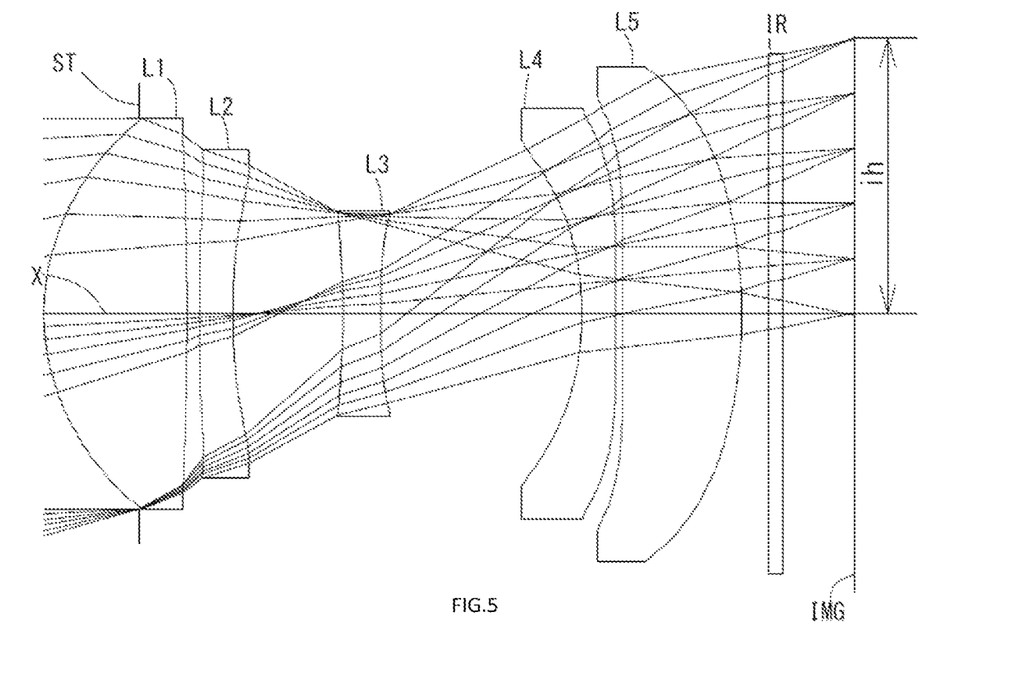
FIG. 5 is a schematic view showing an imaging lens in Example 3 according to the present invention.
Figure 7:
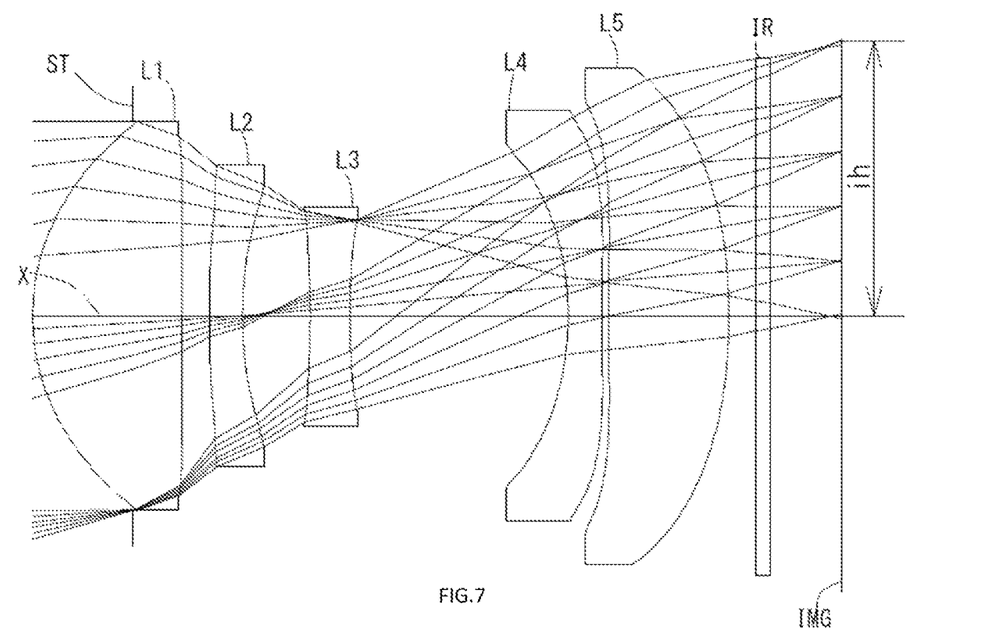
FIG. 7 is a schematic view showing an imaging lens in Example 4 according to the present invention.
Figure 9:
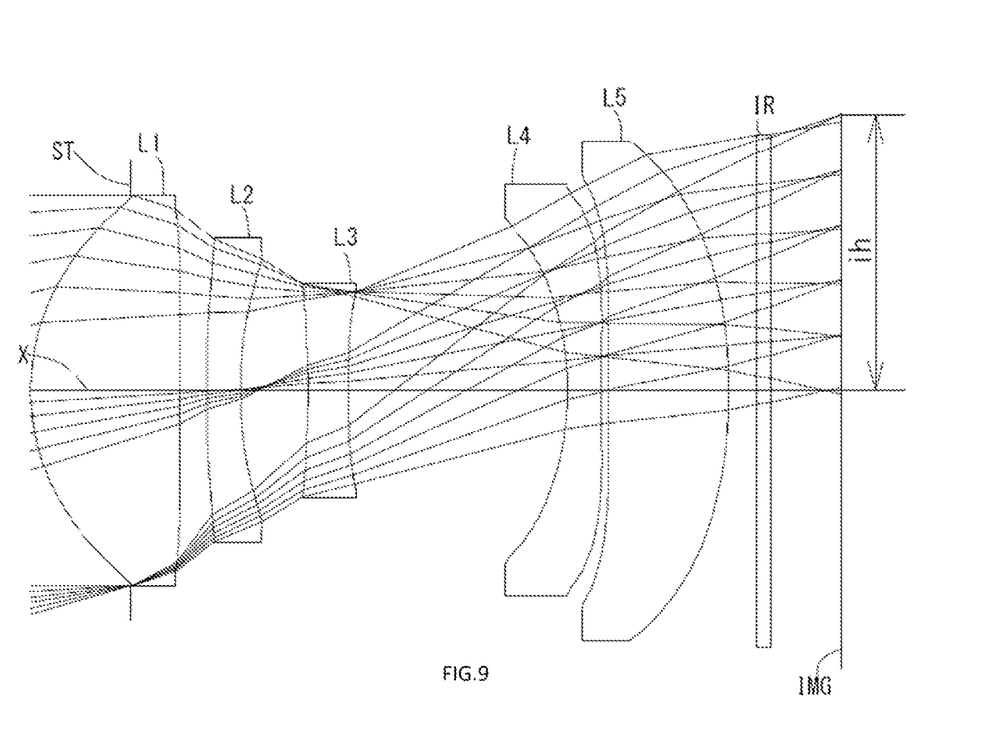
FIG. 9 is a schematic view showing an imaging lens in Example 5 according to the present invention.

An aperture stop ST is arranged between the third lens L3 and the fourth lens L4, and downsizing in a diameter direction is facilitated. The aperture stop ST may be arranged on the object side of the first lens L1 as in the Examples 3, 4 and 5 as shown in FIGS. 5, 7 and 9. In this case, correction of aberrations and control of an incident angle of the light ray of high image height to the image sensor can be facilitated.

The first lens L1 has the positive refractive power and is formed in the biconvex shape having the convex object-side surface and the convex image-side surface in a paraxial region (near the optical axis X). Therefore, reduction in the profile can be achieved by positive refractive power of both sides. The both sides are convex; therefore, a curvature is suppressed from being large, and sensitivity to a manufacturing error can be reduced.

The second lens L2 has the negative refractive power and is formed in a meniscus shape having an object-side surface being convex and an image-side surface being concave in a paraxial region (near the optical axis X). Therefore, chromatic aberration, spherical aberration, coma aberration, astigmatism and distortion are properly corrected.

The third lens L3 has the negative refractive power and is formed in the meniscus shape having an object-side surface being convex and an image-side surface being concave in a paraxial region (near the optical axis X). Therefore, the coma aberration, the astigmatism and the distortion are properly corrected.

The third lens L3 may be formed in a biconcave shape having the object-side surface and the image-side surface being concave in the paraxial region as in the Examples 3, 4 and 5 as shown in FIGS. 5, 7 and 9. This case is favorable for correction of the chromatic aberration by the negative refractive power of the both sides.

The fourth lens L4 has the negative refractive power and is formed in the biconcave shape having the object-side surface and the image-side surface being concave in the paraxial region. Therefore, the chromatic aberration, the astigmatism, the field curvature and the distortion are properly corrected.

The fifth lens L5 has the positive refractive power and is formed in the biconvex shape having the object-side surface and the image-side surface being convex in the paraxial region. Therefore, reduction in the profile is achieved, and the spherical aberration, the astigmatism, the field curvature and the distortion are properly corrected. Furthermore, the image-side surface of the fifth lens L5 is convex in the paraxial region; therefore, a light ray incident angle to the image sensor can be appropriately controlled. As a result, a lens diameter of the fifth lens L5 can be reduced and reduction in the diameter of the imaging lens can be achieved.

Figure 3:
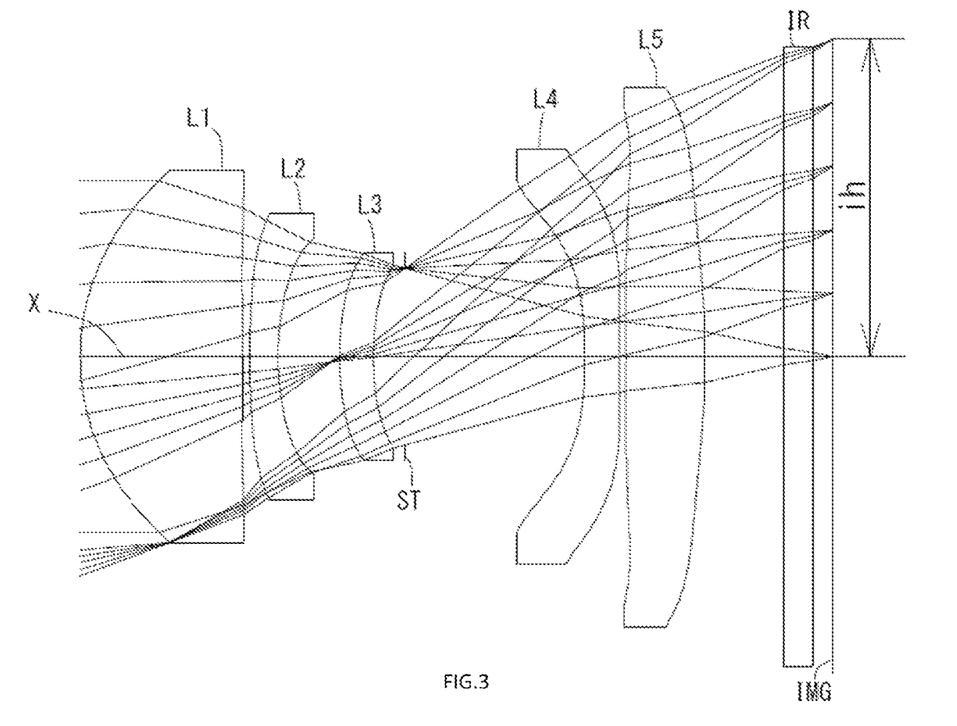
FIG. 3 is a schematic view showing an imaging lens in Example 2 according to the present invention.

The fifth lens L5 may be formed in the meniscus shape having the object-side surface being concave and the image-side surface being convex in the paraxial region as in the Example 2 as shown in FIG. 3. In this case, a light ray incident angle to the fifth lens L5 can be appropriately controlled, and the distortion can be properly corrected.

Regarding the imaging lens according to the present embodiments, it is preferable that all lenses of the first lens L1 to the fifth lens L5 are single lenses. Configuration only with the single lenses can frequently use the aspheric surfaces. In the present embodiments, all lens surfaces are formed as appropriate aspheric surfaces, and the aberrations are favorably corrected. Furthermore, in comparison with a case in which a cemented lens is used, workload is reduced, and manufacturing in low cost becomes possible.

Furthermore, the imaging lens according to the present embodiments makes manufacturing facilitated by using a plastic material for all of the lenses, and mass production in a low cost can be realized.

The material applied to the lens is not limited to the plastic material. By using glass material, further high performance may be aimed. It is preferable that all of lens-surfaces are formed as aspheric surfaces, however, spherical surfaces which are easy to be manufactured may be adopted in accordance with required performance.

The imaging lens according to the present embodiments shows preferable effects by satisfying the following conditional expressions (1) to (14).

$$10.00 < vd2 < 30.00 \tag{1}$$

$$0.10 < |r5|/f < 0.90 \tag{2}$$

$$20.50 < T3/T4 < 49.00 \tag{3}$$

$$2.00 < r8/f < 35.00 \tag{4}$$

$$-1.40 < r10/f5 < -0.40 \tag{5}$$

$$-20.00 < f2/T2 < -5.50 \tag{6}$$

$$36.00 < vd4 < 77.00 \tag{7}$$

$$0.30 < (T4/f) \times 100 < 1.20 \tag{8}$$

$$-16.50 < r2/f < -2.00 \tag{9}$$

$$0.45 < r4/|r5| < 2.00 \tag{10}$$

$$4.00 < |r5|/D3 < 30.00 \tag{11}$$

$$-3.50 < r7/T3 < -0.50 \tag{12}$$

$$2.00 < |r9|/f \tag{13}$$

$$0.10 < T2/T3 < 0.90 \tag{14}$$

where
vd2: an abbe number at d-ray of the second lens L2,
vd4: an abbe number at d-ray of the fourth lens L4,
D3: a thickness along the optical axis X of the third lens L3,
T2: a distance along the optical axis X from an image-side surface of the second lens L2 to an object-side surface of the third lens L3,
T3: a distance along the optical axis X from an image-side surface of the third lens L3 to an object-side surface of the fourth lens L4, T4: a distance along the optical axis X from an image-side surface of the fourth lens L4 to an object-side surface of the fifth lens L5,
f: a focal length of the overall optical system of the imaging lens,
f2: a focal length of the second lens L2,
f5: a focal length of the fifth lens L5,
r2: a paraxial curvature radius of an image-side surface of the first lens L1,
r4: a paraxial curvature radius of an image-side surface of the second lens L2,
r5: a paraxial curvature radius of an object-side surface of the third lens L3,
r7: a paraxial curvature radius of an object-side surface of the fourth lens L4,
r8: a paraxial curvature radius of an image-side surface of the fourth lens L4,
r9: a paraxial curvature radius of an object-side surface of the fifth lens L5, and
r10: a paraxial curvature radius of an image-side surface of the fifth lens L5.

It is not necessary to satisfy the above all conditional expressions, and by satisfying the conditional expression individually, operational advantage corresponding to each conditional expression can be obtained.

The imaging lens according to the present embodiments shows further preferable effects by satisfying the following conditional expressions (1a) to (14a).

$$14.50 < vd2 < 25.00 \tag{1a}$$

$$0.25 < |r5|/f < 0.75 \tag{2a}$$

$$25.00 < T3/T4 < 41.00 \tag{3a}$$

$$3.20 < r8/f < 29.00 \tag{4a}$$

$$-1.10 < r10/f5 < -0.50 \tag{5a}$$

$$-17.00 \le f2/T2 < -8.00 \tag{6a}$$

$$46.00 < vd4 < 66.00 \tag{7a}$$

$$0.50 < (T4/f) \times 100 < 1.00 \tag{8a}$$

$$-13.50 < r2/f < -2.50 \tag{9a}$$

$$0.55 < r4/|r5| < 1.60 \tag{10a}$$

$$6.50 < |r5|/D3 < 23.00 \tag{11a}$$

$$-2.90 < r7/T3 < -1.00 \tag{12a}$$

$$2.50 < |r9|/f < 50.00 \tag{13a}$$

$$0.18 < T2/T3 < 0.70 \tag{14a}$$

The signs in the above conditional expressions have the same meanings as those in the paragraph before the preceding paragraph.

In this embodiment, the aspheric shapes of the aspheric surfaces of the lens are expressed by Equation 1, where Z denotes an axis in the optical axis direction, H denotes a height perpendicular to the optical axis, R denotes a paraxial curvature radius, k denotes a conic constant, and A4, A6, A8, A10, A12, A14, A16, A18 and A20 denote aspheric surface coefficients.

$$Z = \frac{\frac{H^2}{R}}{1 + \sqrt{1 - (k+1)\frac{H^2}{R^2}}} + A_4 H^4 + A_6 H^6 + A_8 H^8 + A_{10} H^{10} + A_{12} H^{12} + A_{14} H^{14} + A_{16} H^{16} + A_{18} H^{18} + A_{20} H^{20} \qquad \text{[Equation 1]}$$

Next, examples of the imaging lens according to this embodiment will be explained. In each example, f denotes a focal length of the overall optical system of the imaging lens, Fno denotes a F-number, w denotes a half field of view, ih denotes a maximum image height, and TTL denotes a total track length. Additionally, i denotes a surface number counted from the object side, r denotes a paraxial curvature radius, d denotes a distance of lenses along the optical axis (surface distance), Nd denotes a refractive index at d-ray (reference wavelength), and vd denotes an abbe number at d-ray. As for aspheric surfaces, an asterisk (*) is added after surface number i.

Example 1

The basic lens data is shown below in Table 1.

TABLE 1

Example 1
Unit mm
f = 6.16
Fno = 2.40
ω(°) = 20.5
ih = 2.30
TTL = 5.41

Surface Data

| i | r | d | Nd | vd | |
|---|---|---|---|---|---|
| (Object) | Infinity | Infinity | | | |
| 1* | 1.6526 | 1.1460 | 1.544 | 56.44 | (vd1) |
| 2* | −39.2396 | 0.0500 | | | |
| 3* | 4.1333 | 0.2131 | 1.671 | 19.24 | (vd2) |
| 4* | 1.7733 | 0.4083 | | | |
| 5* | 2.6909 | 0.2752 | 1.535 | 55.69 | (vd3) |
| 6* | 2.2561 | 0.2516 | | | |
| 7 (Stop) | Infinity | 1.3384 | | | |
| 8* | −3.6558 | 0.2500 | 1.544 | 56.44 | (vd4) |
| 9* | 27.7912 | 0.0500 | | | |
| 10* | 109.3761 | 0.5858 | 1.671 | 19.24 | (vd5) |
| 11* | −15.2247 | 0.5700 | | | |

TABLE 1-continued

Example 1
Unit mm
f = 6.16
Fno = 2.40
ω(°) = 20.5
ih = 2.30
TTL = 5.41

| | | | | |
|---|---|---|---|---|
| 12 | Infinity | 0.2100 | 1.517 | 64.20 |
| 13 | Infinity | 0.1380 | | |
| Image Plane | Infinity | Infinity | | |

Constituent Lens Data

| Lens | Start Surface | Focal Length |
|---|---|---|
| 1 | 1 | 2.942 |
| 2 | 3 | −4.805 |
| 3 | 5 | −33.498 |
| 4 | 8 | −5.917 |
| 5 | 10 | 19.962 |

Aspheric Surface Data

| | First Surface | Second Surface | Third Surface | Fourth Surface | Fifth Surface |
|---|---|---|---|---|---|
| k | −6.646973E−02 | 0.000000E+00 | 1.009354E+01 | 2.041238E+00 | 3.429719E+00 |
| A4 | −1.279493E−03 | −1.772276E−01 | −3.826515E−01 | −3.099633E−01 | 2.456909E−02 |
| A6 | −4.367067E−03 | 8.078670E−01 | 1.294122E+00 | 8.781658E−01 | −1.418966E−01 |
| A8 | −1.479499E−03 | −1.541302E+00 | −2.171746E+00 | −1.310578E+00 | 2.764625E+00 |
| A10 | 1.370126E−02 | 1.793777E+00 | 2.213581E+00 | 1.096692E+00 | −1.448690E+01 |
| A12 | −2.123532E−02 | −1.394374E+00 | −1.435801E+00 | −1.888893E−01 | 4.739405E+01 |
| A14 | 1.431031E−02 | 7.234200E−01 | 5.481910E−01 | −6.364503E−01 | −1.015720E+02 |
| A16 | −4.564340E−03 | −2.393185E−01 | −9.274960E−02 | 4.764885E−01 | 1.366712E+02 |
| A18 | 4.454635E−04 | 4.544222E−02 | 0.000000E+00 | 0.000000E+00 | −1.034618E+02 |
| A20 | 2.757876E−05 | −3.753799E−03 | 0.000000E+00 | 0.000000E+00 | 3.358846E+01 |

| | Sixth Surface | Eighth Surface | Ninth Surface | Tenth Surface | Eleventh Surface |
|---|---|---|---|---|---|
| k | 2.521151E+00 | 1.000000E+00 | 0.000000E+00 | 0.000000E+00 | −1.485096E+01 |
| A4 | 2.102001E−02 | 3.769455E−02 | 3.856033E−02 | −1.815181E−02 | −1.078188E−01 |
| A6 | 1.077126E+00 | −1.351802E+00 | −7.696161E−01 | 1.738714E−01 | 2.532646E−01 |
| A8 | −1.124340E+01 | 4.396306E+00 | 1.862517E+00 | −2.888283E−01 | −2.875815E−01 |
| A10 | 7.678719E+01 | −8.122595E+00 | −2.499888E+00 | 2.601193E−01 | 2.099564E−01 |
| A12 | −3.158483E+02 | 9.442252E+00 | 2.020737E+00 | −1.525916E−01 | −1.045366E−01 |
| A14 | 7.924994E+02 | −6.929866E+00 | −9.910531E−01 | 6.029420E−02 | 3.471095E−02 |
| A15 | −1.189004E+03 | 3.102726E+00 | 2.848824E−01 | −1.542756E−02 | −7.262131E−03 |
| A18 | 9.830877E+02 | −7.709678E−01 | −4.337146E−02 | 2.279924E−03 | 8.578114E−04 |
| A20 | −3.443903E+02 | 8.127820E−02 | 2.625902E−03 | −1.458647E−04 | −4.331289E−05 |

The imaging lens in Example 1 satisfies conditional expressions (1) to (14) as shown in Table 6.

Figure 1:
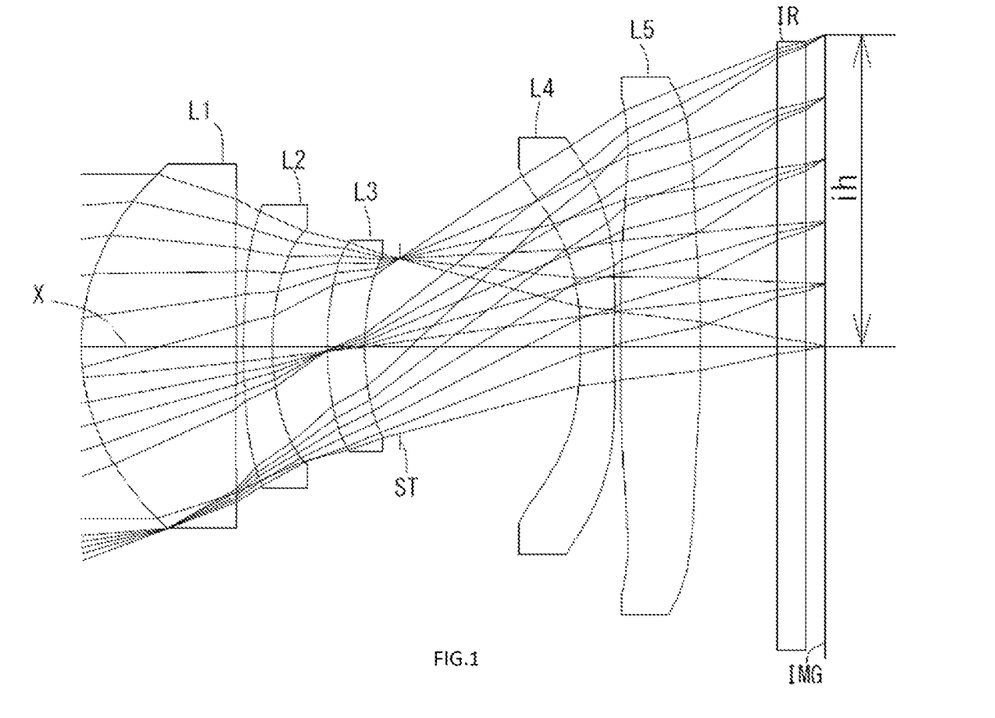
FIG. 1 is a schematic view showing an imaging lens in Example 1 according to the present invention.
Figure 2:
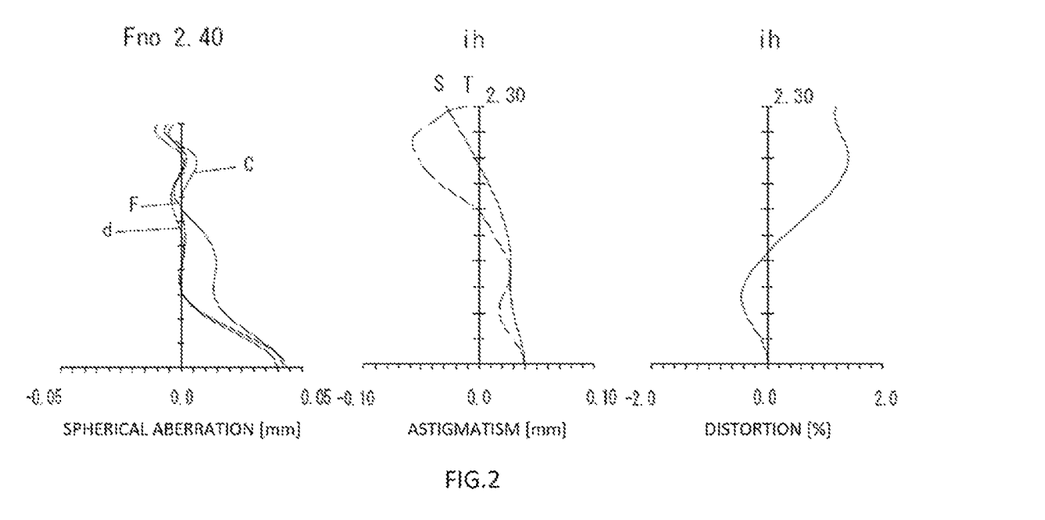
FIG. 2 shows spherical aberration, astigmatism, and distortion of the imaging lens in Example 1 according to the present invention.

FIG. 2 shows spherical aberration (mm), astigmatism (mm), and distortion (%) of the imaging lens in Example 1. The spherical aberration diagram shows the amount of aberration at each wavelength of F-ray (486 nm), d-ray (588 nm), and C-ray (656 nm). The astigmatism diagram shows the amount of aberration at d-ray on a sagittal image surface S (solid line) and on tangential image surface T (broken line), respectively (same as FIGS. 4, 6, 8 and 10). As shown in FIG. 2, each aberration is corrected excellently.

Example 2

The basic lens data is shown below in Table 2.

TABLE 2

Example 2
Unit mm
f = 6.16
Fno = 2.40
ω(°) = 20.5
ih = 2.30
TTL = 5.38

Surface Data

| i | r | d | Nd | vd | |
|---|---|---|---|---|---|
| (Object) | Infinity | Infinity | | | |
| 1* | 1.6530 | 1.1749 | 1.544 | 56.44 | (vd1) |
| 2* | −42.1708 | 0.0500 | | | |

TABLE 2-continued

Example 2
Unit mm
f = 6.16
Fno = 2.40
ω(°) = 20.5
ih = 2.30
TTL = 5.38

| | | | | | |
|---|---|---|---|---|---|
| 3* | 4.0554 | 0.2050 | 1.671 | 19.24 | (vd2) |
| 4* | 1.7733 | 0.4475 | | | |
| 5* | 2.3920 | 0.2435 | 1.535 | 55.69 | (vd3) |
| 6* | 1.9579 | 0.2316 | | | |
| 7 (Stop) | Infinity | 1.2989 | | | |
| 8* | −3.3191 | 0.2500 | 1.544 | 56.44 | (vd4) |
| 9* | 31.7415 | 0.0500 | | | |
| 10* | −52.8594 | 0.5690 | 1.671 | 19.24 | (vd5) |
| 11* | −9.6020 | 0.5700 | | | |
| 12 | Infinity | 0.2100 | 1.517 | 64.20 | |
| 13 | Infinity | 0.1470 | | | |
| Image Plane | Infinity | | | | |

Constituent Lens Data

| Lens | Start Surface | Focal Length |
|---|---|---|
| 1 | 1 | 2.949 |
| 2 | 3 | −4.874 |
| 3 | 5 | −33.669 |
| 4 | 8 | −5.505 |
| 5 | 10 | 17.401 |

Aspheric Surface Data

| | First Surface | Second Surface | Third Surface | Fourth Surface | Fifth Surface |
|---|---|---|---|---|---|
| k | −6.480485E−02 | 0.000000E+00 | 1.027997E+01 | 2.276912E+00 | 3.964667E+00 |
| A4 | 1.431352E−04 | −2.151818E−01 | −4.917527E−01 | −3.952282E−01 | −1.567263E−01 |
| A6 | −1.070082E−03 | 1.153999E+00 | 1.927688E+00 | 1.273035E+00 | 1.696603E+00 |
| A8 | −8.983659E−03 | −2.514969E+00 | −3.826595E+00 | −2.293328E+00 | −9.767873E+00 |
| A10 | 3.065898E−02 | 3.208632E+00 | 4.519951E+00 | 2.625467E+00 | 4.327984E+01 |
| A12 | −4.386847E−02 | −2.631999E+00 | −3.222340E+00 | −1.573254E+00 | −1.272452E+02 |
| A14 | 3.218270E−02 | 1.406210E+00 | 1.287878E+00 | 2.358349E−01 | 2.427171E+02 |
| A16 | −1.303257E−02 | −4.732110E−01 | −2.226277E−01 | 1.828490E−01 | −2.875613E+02 |
| A18 | 2.650715E−03 | 9.102676E−02 | 0.000000E+00 | 0.000000E+00 | 1.924545E+02 |
| A20 | −2.109026E−04 | −7.623070E−03 | 0.000000E+00 | 0.000000E+00 | −5.534147E+01 |

| | Sixth Surface | Eighth Surface | Ninth Surface | Tenth Surface | Eleventh Surface |
|---|---|---|---|---|---|
| k | 2.163308E+00 | 1.300000E+00 | 0.000000E+00 | 0.000000E+00 | 2.615154E+00 |
| A4 | −3.499981E−01 | 1.045370E−01 | 1.604030E−01 | −3.495832E−02 | −1.451308E−01 |
| A6 | 7.943172E+00 | −1.528510E+00 | −1.269904E+00 | 2.308516E−01 | 3.323900E−01 |
| A8 | −9.004883E+01 | 3.922309E+00 | 2.837581E+00 | −3.849428E−01 | −3.428872E−01 |
| A10 | 6.444648E+02 | −5.703973E+00 | −3.783236E+00 | 3.415730E−01 | 2.028760E−01 |
| A12 | −2.907466E+03 | 5.210279E+00 | 3.222745E+00 | −1.827306E−01 | −7.225022E−02 |
| A14 | 8.293887E+03 | −3.081948E+00 | −1.759246E+00 | 6.062930E−02 | 1.502401E−02 |
| A16 | −1.450877E+04 | 1.184658E+00 | 5.928849E−01 | −1.227711E−02 | −1.603554E−03 |
| A18 | 1.421067E+04 | −2.752326E−01 | −1.118251E−01 | 1.397772E−03 | 4.693553E−05 |
| A20 | −8.966595E+03 | 2.940462E−02 | 9.003601E−03 | −6.879653E−05 | 3.397765E−06 |

The imaging lens in Example 2 satisfies conditional expressions (1) to (14) as shown in Table 6.

Figure 4:
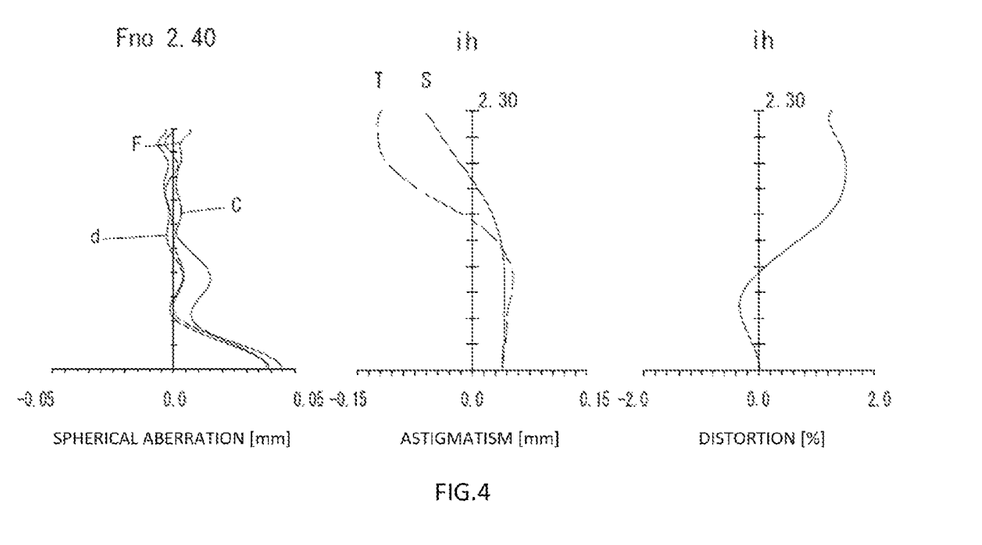
FIG. 4 shows spherical aberration, astigmatism, and distortion of the imaging lens in Example 2 according to the present invention.

FIG. 4 shows spherical aberration (mm), astigmatism (mm), and distortion (%) of the imaging lens in Example 2. As shown in FIG. 4, each aberration is corrected excellently.

Example 3

The basic lens data is shown below in Table 3.

TABLE 3

Example 3
Unit mm
f = 7.20
Fno = 2.40
ω(°) = 15.8
ih = 2.04
TTL = 5.96

Surface Data

| i | r | d | Nd | νd | |
|---|---|---|---|---|---|
| (Object) | Infinity | Infinity | | | |
| 1 (Stop) | Infinity | −0.7041 | | | |
| 2* | 1.7064 | 1.0602 | 1.544 | 56.44 | (νd1) |
| 3* | −21.3503 | 0.0927 | | | |
| 4* | 40.2179 | 0.2450 | 1.671 | 19.24 | (νd2) |
| 5* | 5.0037 | 0.8171 | | | |
| 6* | −3.8854 | 0.2800 | 1.614 | 25.59 | (νd3) |
| 7* | 22.2823 | 1.4853 | | | |
| 8* | −2.3356 | 0.2500 | 1.544 | 56.44 | (νd4) |
| 9* | 35.0265 | 0.0500 | | | |
| 10* | 178.4332 | 0.8836 | 1.671 | 19.24 | (νd5) |
| 11* | −3.8210 | 0.2000 | | | |
| 12 | Infinity | 0.1100 | 1.517 | 64.17 | |
| 13 | Infinity | 0.5276 | | | |
| Image Plane | Infinity | | | | |

Constituent Lens Data

| Lens | Start Surface | Focal Length |
|---|---|---|
| 1 | 2 | 2.950 |
| 2 | 4 | −8.544 |
| 3 | 6 | −5.365 |
| 4 | 8 | −4.012 |
| 5 | 10 | 5.588 |

Aspheric Surface Data

| | Second Surface | Third Surface | Fourth Surface | Fifth Surface | Sixth Surface |
|---|---|---|---|---|---|
| k | −4.850939E−02 | 0.000000E+00 | −7.312661E+01 | −4.314671E−01 | −4.584112E+00 |
| A4 | −2.074774E−02 | −9.482573E−02 | −1.208025E−01 | −6.182821E−02 | 4.051087E−01 |
| A6 | 7.913080E−02 | 6.673807E−01 | 1.186943E+00 | 1.029944E+00 | −3.987298E+00 |
| A8 | −2.274950E−01 | −1.874500E+00 | −3.899976E+00 | −4.295451E+00 | 3.676441E+01 |
| A10 | 3.878194E−01 | 3.015009E+00 | 7.291539E+00 | 1.036908E+01 | −2.128845E+02 |
| A12 | −4.159997E−01 | −3.051333E+00 | −8.640035E+00 | −1.613155E+01 | 7.689337E+02 |
| A14 | 2.811658E−01 | 1.974670E+00 | 6.542823E+00 | 1.612926E+01 | −1.746237E+03 |
| A16 | −1.161536E−01 | −7.933762E−01 | −3.053439E+00 | −9.973781E+00 | 2.422523E+03 |
| A18 | 2.673424E−02 | 1.804851E−01 | 7.967645E−01 | 3.463098E+00 | −1.875184E+03 |
| A20 | −2.622695E−03 | −1.779581E−02 | −8.862201E−02 | −5.154138E−01 | 5.205100E+02 |

| | Seventh Surface | Eighth Surface | Ninth Surface | Tenth Surface | Eleventh Surface |
|---|---|---|---|---|---|
| k | −9.900000E+01 | 0.000000E+00 | 0.000000E+00 | 0.000000E+00 | 0.000000E+00 |
| A4 | 3.052008E−01 | −9.504369E−02 | −5.957058E−02 | −7.557208E−04 | −1.225162E−02 |
| A6 | −8.601368E−01 | 5.773480E−01 | 4.096163E−01 | 2.185796E−01 | 4.365035E−03 |
| A8 | 4.552424E+00 | −3.191782E+00 | −2.153464E+00 | −1.085191E+00 | 2.375682E−02 |
| A10 | −1.263339E+01 | 9.355779E+00 | 4.752275E+00 | 2.110134E+00 | −6.476608E−02 |
| A12 | −6.198741E−01 | −1.559865E+01 | −5.693275E+00 | −2.250712E+00 | 6.424030E−02 |
| A14 | 1.015169E+02 | 1.543074E+01 | 3.992243E+00 | 1.419302E+00 | −3.411045E−02 |
| A16 | −2.766218E+02 | −8.973000E+00 | −1.636451E+00 | −5.265518E−01 | 1.037508E−02 |
| A18 | 3.195367E+02 | 2.831750E+00 | 3.628801E−01 | 1.060675E−01 | −1.714236E−03 |
| A20 | −1.414236E+02 | −3.734000E−01 | −3.358095E−02 | −8.935539E−03 | 1.195948E−04 |

The imaging lens in Example 3 satisfies conditional expressions (1) to (14) as shown in Table 6.

Figure 6:
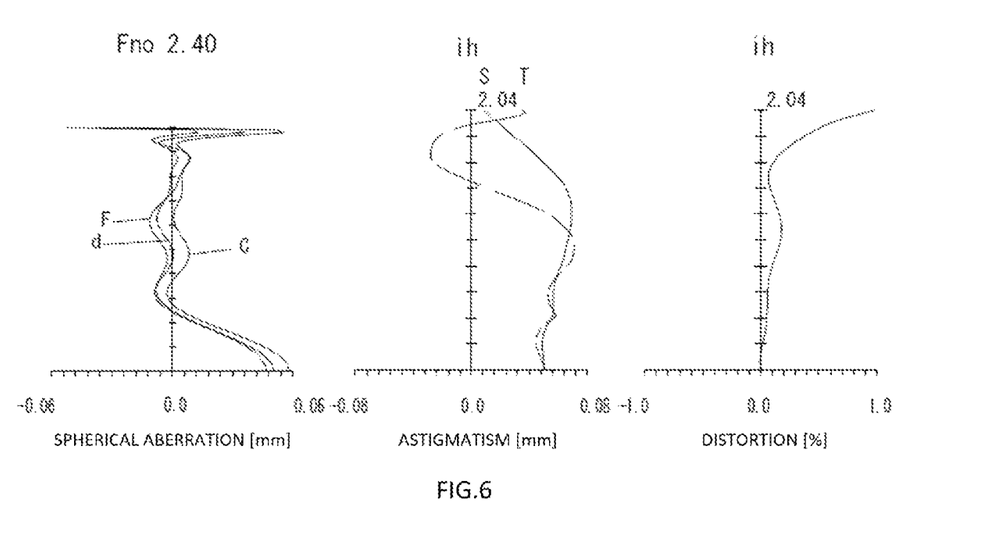
FIG. 6 shows spherical aberration, astigmatism, and distortion of the imaging lens in Example 3 according to the present invention.

FIG. 6 shows spherical aberration (mm), astigmatism (mm), and distortion (%) of the imaging lens in Example 3. As shown in FIG. 6, each aberration is corrected excellently.

Example 4

The basic lens data is shown below in Table 4.

TABLE 4

Example 4
Unit mm
f = 7.20
Fno = 2.40
ω(°) = 15.9
ih = 2.04
TTL = 5.96

Surface Data

| i | r | d | Nd | νd | |
|---|---|---|---|---|---|
| (Object) | Infinity | Infinity | | | |
| 1 (Stop) | Infinity | −0.7377 | | | |
| 2* | 1.6234 | 1.1055 | 1.544 | 56.44 | (νd1) |
| 3* | −78.6361 | 0.2055 | | | |
| 4* | 17.8858 | 0.2472 | 1.671 | 19.24 | (νd2) |
| 5* | 3.5346 | 0.5000 | | | |
| 6* | −4.6155 | 0.2987 | 1.614 | 25.59 | (νd3) |
| 7* | 33.9433 | 1.6135 | | | |
| 8* | −2.2074 | 0.2500 | 1.544 | 56.44 | (νd4) |
| 9* | 31.2941 | 0.0500 | | | |
| 10* | 21.0559 | 0.8936 | 1.671 | 19.24 | (νd5) |
| 11* | −4.2954 | 0.2000 | | | |
| 12 | Infinity | 0.1100 | 1.517 | 64.17 | |
| 13 | Infinity | 0.5268 | | | |
| Image Plane | Infinity | | | | |

Constituent lens Data

| Lens | Start Surface | Focal length |
|---|---|---|
| 1 | 2 | 2.936 |
| 2 | 4 | −5.613 |
| 3 | 6 | −6.895 |
| 4 | 8 | −3.777 |
| 5 | 10 | 5.395 |

Aspheric Surface Data

| | Second Surface | Third Surface | Fourth Surface | Fifth Surface | Sixth Surface |
|---|---|---|---|---|---|
| k | −1.075000E−01 | 0.000000E+00 | 5.500000E+01 | 3.630358E−01 | 2.408069E+00 |
| A4 | −1.603799E−02 | 1.821507E−02 | 4.084822E−02 | −5.037554E−02 | 3.317309E−01 |
| A6 | 8.900601E−02 | 9.602220E−02 | 3.881615E−01 | 2.025986E+00 | −1.931605E+00 |
| A8 | −2.739078E−01 | −4.400012E−01 | −3.468075E+00 | −1.255793E+01 | 1.223334E+01 |
| A10 | 4.864424E−01 | 8.718801E−01 | 9.896230E+00 | 4.393990E+01 | −5.223115E+01 |
| A12 | −5.307375E−01 | −1.039878E+00 | −1.741746E+01 | −9.695547E+01 | 1.395239E+02 |
| A14 | 3.600739E−01 | 7.753300E−01 | 1.930927E+01 | 1.355990E+02 | −2.352046E+02 |
| A16 | −1.482423E−01 | −3.530081E−01 | −1.305997E+01 | −1.164050E+02 | 2.420061E+02 |
| A18 | 3.385523E−02 | 3.987299E−02 | 4.921260E+00 | 5.599602E+01 | −1.376945E+02 |
| A20 | −3.301692E−03 | −9.825551E−03 | −7.928041E−01 | −1.157789E+01 | 3.268000E+01 |

| | Seventh Surface | Eighth Surface | Ninth Surface | Tenth Surface | Eleventh Surface |
|---|---|---|---|---|---|
| k | 0.000000E+00 | 0.000000E+00 | 0.000000E+00 | 0.000000E+00 | 0.000000E+00 |
| A4 | 5.187744E−01 | 4.584798E−02 | 1.879454E−01 | 1.003143E−01 | −2.106187E−02 |
| A6 | −5.042962E+00 | −1.242617E−01 | −9.420195E−01 | −5.321352E−01 | −3.315378E−02 |
| A8 | 4.344217E+01 | −6.414054E−01 | 1.398945E+00 | 7.587927E−01 | 8.542177E−02 |
| A10 | −2.261445E+02 | 3.530708E+00 | −6.509205E−01 | −3.502550E−01 | −1.126688E−01 |
| A12 | 7.126549E+02 | −7.401690E+00 | −5.576748E−01 | −2.205426E−01 | 9.154002E−02 |
| A14 | −1.337123E+03 | 8.332558E+00 | 8.878456E−01 | 3.475509E−01 | −4.617117E−02 |
| A16 | 1.376636E+03 | −5.286844E+00 | −4.770879E−01 | −1.734871E−01 | 1.386821E−02 |
| A18 | −6.045640E+02 | 1.775020E+00 | 1.193043E−01 | 4.009131E−02 | −2.258348E−03 |
| A20 | 9.180000E+00 | −2.443000E−01 | −1.160371E−02 | −3.614608E−03 | 1.529652E−04 |

The imaging lens in Example 4 satisfies conditional expressions (1) to (14) as shown in Table 6.

Figure 8:
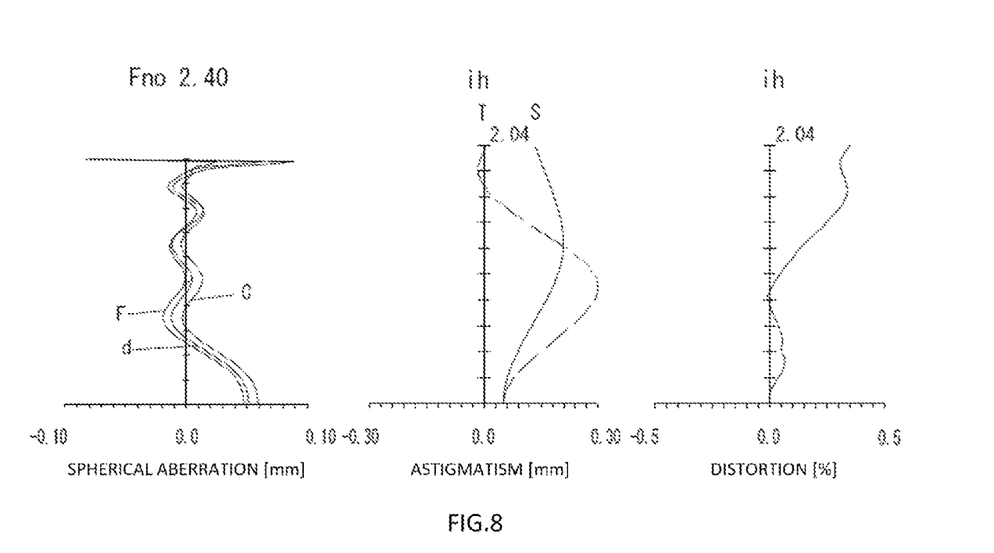
FIG. 8 shows spherical aberration, astigmatism, and distortion of the imaging lens in Example 4 according to the present invention.

FIG. 8 shows spherical aberration (mm), astigmatism (mm), and distortion (%) of the imaging lens in Example 4. As shown in FIG. 8, each aberration is corrected excellently.

Example 5

The basic lens data is shown below in Table 5.

TABLE 5

Example 5
Unit mm
f = 7.20
Fno = 2.40
ω(°) = 16.0
ih = 2.04
TTL = 5.96

Surface Data

| i | r | d | Nd | νd | |
|---|---|---|---|---|---|
| (Object) | Infinity | Infinity | | | |
| 1 (Stop) | Infinity | −0.7367 | | | |
| 2* | 1.6326 | 1.0974 | 1.544 | 56.44 | (νd1) |
| 3* | −48.6508 | 0.2050 | | | |
| 4* | 22.5536 | 0.2496 | 1.671 | 19.24 | (νd2) |
| 5* | 3.7549 | 0.5000 | | | |
| 6* | −4.3075 | 0.2979 | 1.614 | 25.59 | (νd3) |
| 7* | 42.8455 | 1.6213 | | | |
| 8* | −2.2410 | 0.2500 | 1.544 | 56.44 | (νd4) |
| 9* | 165.3714 | 0.0500 | | | |
| 10* | 49.9108 | 0.8927 | 1.671 | 19.24 | (νd5) |
| 11* | −4.1347 | 0.2000 | | | |
| 12 | Infinity | 0.1100 | 1.517 | 64.17 | |
| 13 | Infinity | 0.5257 | | | |
| Image Plane | Infinity | | | | |

Constituent Lens Data

| Lens | Start Surface | Focal Length |
|---|---|---|
| 1 | 2 | 2.924 |
| 2 | 4 | −6.752 |
| 3 | 6 | −6.357 |
| 4 | 8 | −4.059 |
| 5 | 10 | 5.731 |

Aspheric Surface Data

| | Second Surface | Third Surface | Fourth Surface | Fifth Surface | Sixth Surface |
|---|---|---|---|---|---|
| k | −1.404541E−01 | 0.000000E+00 | 2.641489E+02 | 1.564142E+00 | −9.950852E−01 |
| A4 | −1.203901E−2 | 3.394558E−02 | 7.371014E−02 | −2.513409E−02 | 3.367861E−01 |
| A6 | 7.918856E−02 | 5.007861E−02 | 4.707908E−01 | 1.891094E+00 | −1.967334E+00 |
| A8 | −2.553516E−01 | −4.165866E−01 | −3.471478E+00 | −1.241728E+01 | 1.279863E+01 |
| A10 | 4.675312E−01 | 9.623321E−01 | 1.069653E+01 | 4.446776E+01 | −5.698635E+01 |
| A12 | −5.233542E−01 | −1.232269E+00 | −1.936586E+01 | −9.843845E+01 | 1.617984E+02 |
| A14 | 3.633341E−01 | 9.514130E−01 | 2.159841E+01 | 1.368194E+02 | −2.942460E+02 |
| A16 | −1.527004E−01 | −4.407782E−01 | −1.456078E+01 | −1.163017E+02 | 3.308428E+02 |
| A18 | 3.550857E−02 | 1.131481E−01 | 5.450707E+00 | 5.536365E+01 | −2.084806E+02 |
| A20 | −3.517238E−03 | −1.240644E−02 | −8.716155E−01 | −1.133963E+01 | 5.585444E+01 |

| | Seventh Surface | Eighth Surface | Ninth Surface | Tenth Surface | Eleventh Surface |
|---|---|---|---|---|---|
| k | 0.000000E+00 | 0.000000E+00 | 0.000000E+00 | 0.000000E+00 | 0.000000E+00 |
| A4 | 5.242605E−01 | 6.090194E−02 | 2.142377E−01 | 1.027797E−01 | −2.788012E−02 |
| A6 | −5.459702E+00 | −2.937105E−01 | −9.711624E−01 | −4.437229E−01 | −7.761255E−03 |
| A8 | 5.233420E+01 | 1.612716E−01 | 1.477360E+00 | 5.024013E−01 | 4.812177E−02 |
| A10 | −3.076243E+02 | 1.367569E+00 | −9.152200E−01 | −1.100272E+00 | −8.137479E−02 |
| A12 | 1.124260E+03 | −3.860242E+00 | −1.310929E−01 | −4.846704E−01 | 7.461064E−02 |
| A14 | −2.563585E+03 | 4.771726E+00 | 5.245585E−01 | 4.760663E−01 | −4.051055E−02 |
| A16 | 3.527459E+03 | −3.153347E+00 | −3.058168E−01 | −2.116720E−01 | 1.286352E−02 |
| A18 | −2.660585E+03 | 1.079200E+00 | 7.684529E−02 | 4.635806E−02 | −2.197069E−03 |
| A20 | 8.365021E+02 | −1.495000E−01 | −7.250000E−03 | −4.044044E−03 | 1.553382E−04 |

The imaging lens in Example 5 satisfies conditional expressions (1) to (14) as shown in Table 6.

Figure 10:
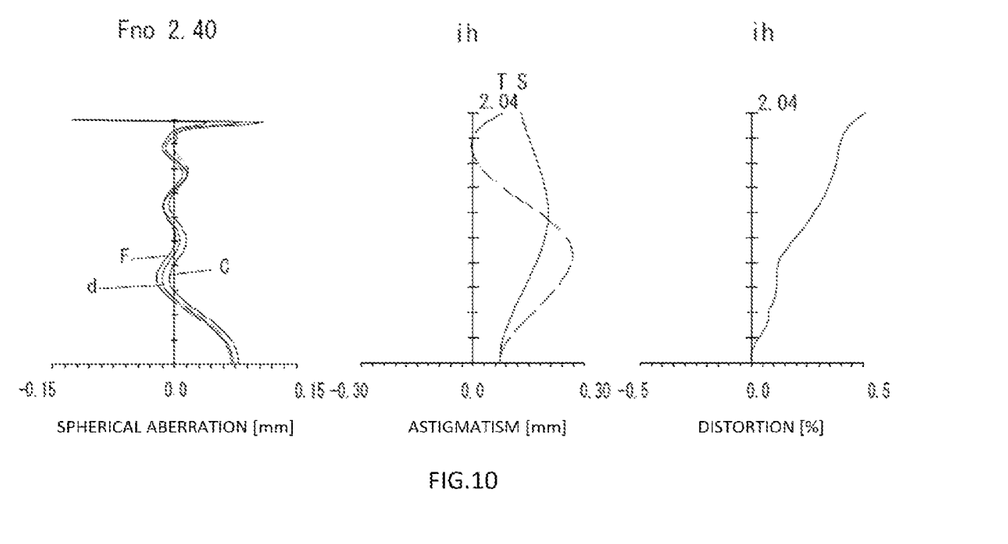
FIG. 10 shows spherical aberration, astigmatism, and distortion of the imaging lens in Example 5 according to the present invention.

FIG. 10 shows spherical aberration (mm), astigmatism (mm), and distortion (%) of the imaging lens in Example 5. As shown in FIG. 10, each aberration is corrected excellently.

In table 6, values of conditional expressions (1) to (14) related to the Examples 1 to 5 are shown.

TABLE 6

| Conditional Expressions | Example 1 | Example 2 | Example 3 | Example 4 | Example 5 |
|---|---|---|---|---|---|
| (1) vd2 | 19.24 | 19.24 | 19.24 | 19.24 | 19.24 |
| (2) |r5|/f | 0.44 | 0.37 | 0.54 | 0.64 | 0.60 |
| (3) T3/T4 | 31.80 | 30.61 | 29.71 | 32.27 | 32.43 |
| (4) r8/f | 4.51 | 5.15 | 4.86 | 4.34 | 22.96 |
| (5) r10/f5 | −0.76 | −0.55 | −0.68 | −0.80 | −0.72 |
| (6) f2/T2 | −11.77 | −10.89 | −10.46 | −13.23 | −13.50 |
| (7) vd4 | 56.44 | 56.44 | 56.44 | 56.44 | 56.44 |
| (8) (T4/f) × 100 | 0.81 | 0.81 | 0.69 | 0.69 | 0.69 |
| (9) r2/f | −6.37 | −6.85 | −2.96 | −10.92 | −6.75 |
| (10) r4/|r5| | 0.66 | 0.77 | 1.29 | 0.77 | 0.87 |
| (11) |r5|/D3 | 9.78 | 9.41 | 13.88 | 15.45 | 14.46 |
| (12) r7/T3 | −2.30 | −2.17 | −1.57 | −1.37 | −1.38 |
| (13) |r9|/f | 17.76 | 8.58 | 24.77 | 2.92 | 6.93 |
| (14) T2/T3 | 0.26 | 0.29 | 0.55 | 0.31 | 0.31 |

When the imaging lens according to the present invention is adopted to a product with the camera function, there is realized contribution to low-profileness and low F-number of the camera and also high performance thereof.

DESCRIPTION OF REFERENCE NUMERALS

ST: aperture stop
L1: first lens
L2: second lens
L3: third lens
L4: fourth lens
L5: fifth lens
ih: maximum image height
IR: filter
IMG: imaging plane

What is claimed is:

1. An imaging lens comprising in order from an object side to an image side,
   a first lens with positive refractive power formed in a biconvex shape having an object-side surface and an image-side surface being convex in a paraxial region,
   a second lens with negative refractive power in a paraxial region,
   a third lens with the negative refractive power in a paraxial region,
   a fourth lens with the negative refractive power in a paraxial region, and
   a fifth lens with the positive refractive power having an image-side surface being convex in a paraxial region,
   wherein an image-side surface of said third lens is concave in the paraxial region, and the following conditional expressions (1), (2) and (4) are satisfied:

$$10.00 < vd2 < 30.00 \quad (1)$$

$$0.10 < |r5|/f < 0.90 \quad (2)$$

$$2.00 < r8/f < 35.00 \quad (4)$$

where
vd2: an abbe number at d-ray of the second lens,
r5: a paraxial curvature radius of an object-side surface of the third lens,
r8: a paraxial curvature radius of an image-side surface of the fourth lens, and
f: a focal length of the overall optical system of the imaging lens.

2. The imaging lens according to claim 1, wherein an object-side surface of said second lens is convex in the paraxial region.

3. The imaging lens according to claim 1, wherein the following conditional expression (3) is satisfied:

$$20.50 < T3/T4 < 49.00 \quad (3)$$

where
T3: a distance along an optical axis from an image-side surface of the third lens to an object-side surface of the fourth lens, and
T4: a distance along an optical axis from an image-side surface of the fourth lens to an object-side surface of the fifth lens.

4. The imaging lens according to claim 1, wherein the following conditional expression (5) is satisfied:

$$-1.40 < r10/f5 < -0.40 \quad (5)$$

where
r10: a paraxial curvature radius of an image-side surface of the fifth lens, and
f5: a focal length of the fifth lens.

5. The imaging lens according to claim 1, wherein the following conditional expression (6) is satisfied:

$$-20.00 < f2/T2 < -5.50 \qquad (6)$$

where
f2: a focal length of the second lens, and
T2: a distance along an optical axis from an image-side surface of the second lens to an object-side surface of the third lens.

\* \* \* \* \*